(12) United States Patent
Huang

(10) Patent No.: US 12,726,600 B2
(45) Date of Patent: Sep. 1, 2026

(54) PROJECTOR CONTROL METHOD AND PROJECTOR DEVICE

(71) Applicant: BENQ CORPORATION, Taipei City (TW)

(72) Inventor: Chih-Pen Huang, New Taipei City (TW)

(73) Assignee: BENQ CORPORATION, Taipei City (TW)

( * ) Notice: Subject to any disclaimer, the term of this patent is extended or adjusted under 35 U.S.C. 154(b) by 0 days.

(21) Appl. No.: 19/056,699

(22) Filed: Feb. 18, 2025

(65) Prior Publication Data

US 2026/0059079 A1 Feb. 26, 2026

(30) Foreign Application Priority Data

Aug. 23, 2024 (TW) ................................ 113131814

(51) Int. Cl.
*H04N 9/31* (2006.01)

(52) U.S. Cl.
CPC ......... *H04N 9/3182* (2013.01); *H04N 9/3194* (2013.01); *H04N 9/3155* (2013.01); *H04N 9/317* (2013.01)

(58) Field of Classification Search
None
See application file for complete search history.

(56) References Cited

U.S. PATENT DOCUMENTS

2014/0071409 A1* 3/2014 Nakashin ............ H04N 9/3185 353/121
2024/0114117 A1* 4/2024 Qi ....................... H04N 9/3188

FOREIGN PATENT DOCUMENTS

TW 201737701 A 10/2017

* cited by examiner

*Primary Examiner* — Samira Monshi
(74) *Attorney, Agent, or Firm* — Winston Hsu

(57) ABSTRACT

A projector control method with an environment adaptive function is applied to a projector device and includes driving a projection lens to project a projection image onto a projection curtain, utilizing an image detector to acquire a detection image relevant to the projection image, driving a size detector to acquire a size of the detection image on the projection curtain, driving an ambient light sensor to acquire an ambient light intensity, and acquiring a control parameter combination in accordance with the size of the detection image, the ambient light intensity and an image intensity of the detection image to adjust an intensity, color temperature or color of the projection image.

14 Claims, 3 Drawing Sheets

PROJECTOR CONTROL METHOD AND PROJECTOR DEVICE

BACKGROUND OF THE INVENTION

1. Field of the Invention

The present invention relates to a projector control method and a projector device, and more particularly, to a projector control method with an environment adaptive function and a related projector device.

2. Description of the Prior Art

A projector is the electronic product that consumes a lot of power. The conventional projector detects the control signal of the signal source to activate the power switch of the projector for power economy; however, the power economy method does not conform to general habits of the user, and the conventional projector which includes the solid-state light source cannot immediately complete the required conversion result due to the photoelectric conversion feature of the solid-state light source. Therefore, design of a projector control method that has the power economy effect and meets the normal viewing requirement is an important issue in the projector industry.

SUMMARY OF THE INVENTION

The present invention provides a projector control method with an environment adaptive function and a related projector device for solving above drawbacks.

According to the claimed invention, a projector control method with an environment adaptive function is applied to a projector device. The projector control method includes driving a projection lens to project a projection image onto a projection curtain, utilizing an image detector to acquire a detection image relevant to the projection image, driving a size detector to acquire a size of the detection image on the projection curtain, driving an ambient light sensor to acquire an ambient light intensity, and acquiring a control parameter combination in accordance with the size of the detection image, the ambient light intensity and an image intensity of the detection image to adjust an intensity, color temperature or color of the projection image.

According to the claimed invention, the projector device with the environment adaptive function includes a projection lens, an image detector, a size detector, an ambient light sensor and an operation processor. The projection lens is adapted to project a projection image onto a projection curtain. The image detector is adapted to acquire a detection image relevant to the projection image. The size detector is adapted to acquire a size of the detection image on the projection curtain. The ambient light sensor is adapted to acquire an ambient light intensity. The operation processor is electrically connected with the projection lens, the image detector, the size detector and the ambient light sensor. The operation processor is adapted to acquire a control parameter combination in accordance with the size of the detection image, the ambient light intensity and an image intensity of the detection image for adjusting an intensity, color temperature or color of the projection image.

The projector device of the present invention can utilize a built-in function to determine that the projector device is in the forward projection mode (e.g., the projector device is put on the table) or in the inverted projection mode (e.g., the projector device is installed on the ceiling) before execution of the projector control method, and then correctly execute the image calibration procedure to acquire the size of the detection image on the projection curtain. Further, the projector control method of the present invention can preferably utilize the black projection image and the white projection image to respectively decide the ambient light intensity and the projection intensity of the projection image, so as to acquire the corresponding control parameter combination for adjusting the intensity, the color temperature and/or the color of the projection image. The projector device and the projector control method of the present invention can effectively mitigate or eliminate interactive influence of reflected brightness gain change and the ambient light intensity resulted by different gains or different sizes of the projection curtain, and therefore can further adjust the projection image in accordance with the usage scenario to improve the viewing effect of the detection image.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
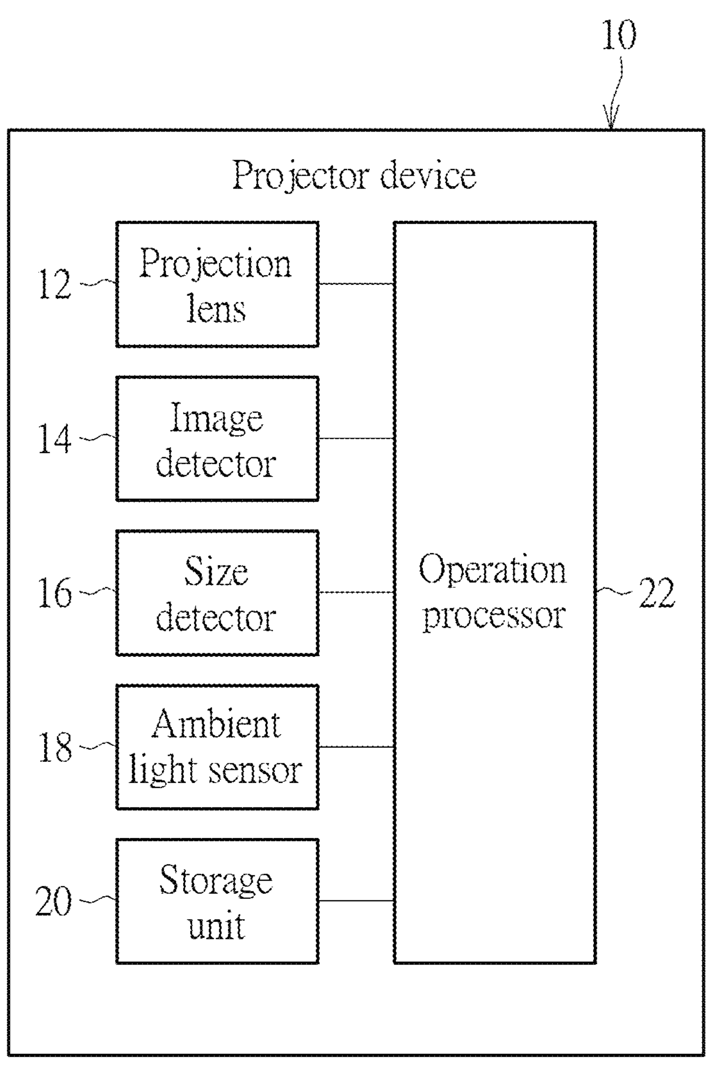
FIG. 1 is a functional block diagram of a projector device according to an embodiment of the present invention.
Figure 2:
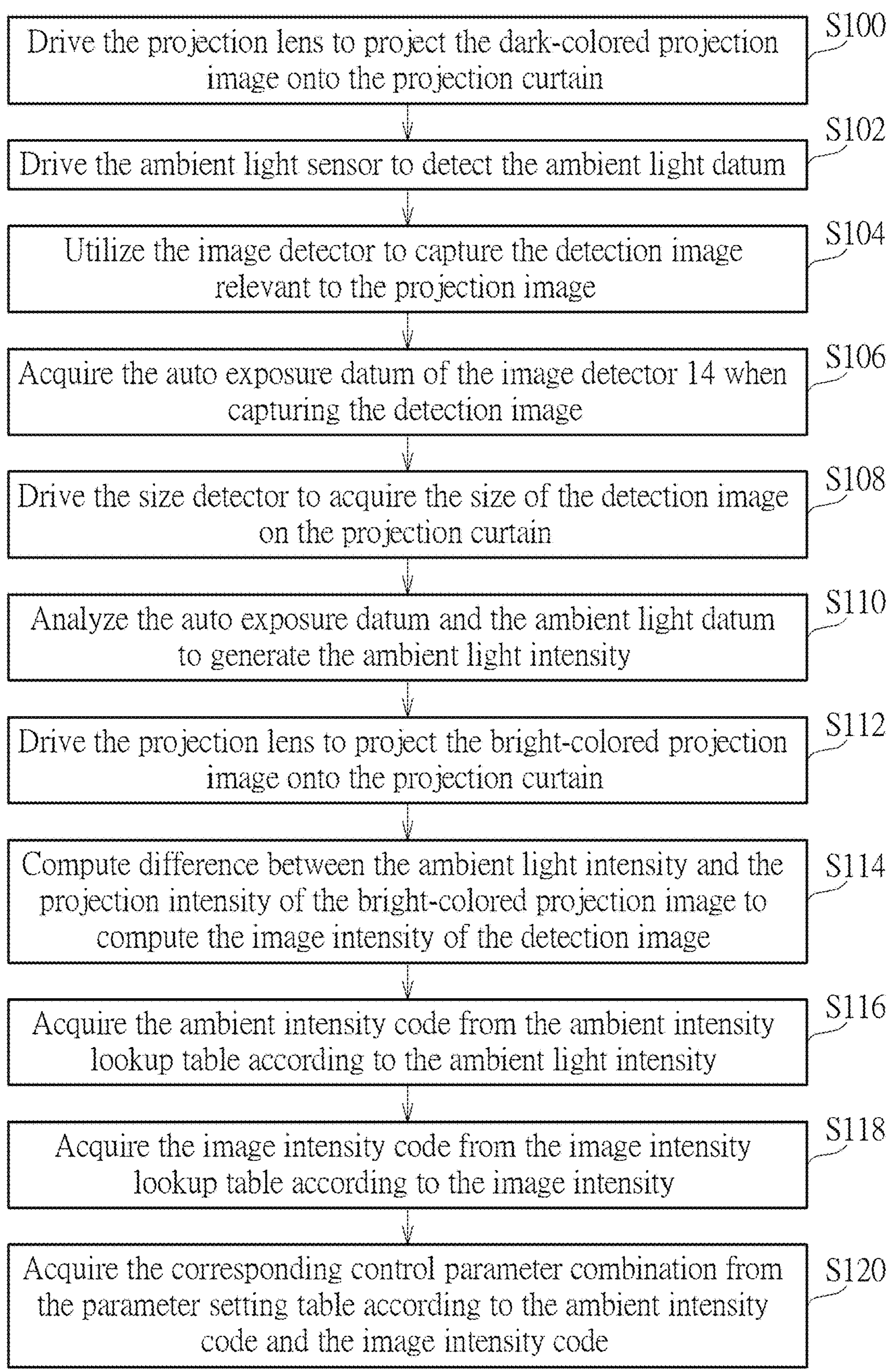
FIG. 2 is a flow chart of a projector control method according to the embodiment of the present invention.
Figure 3:
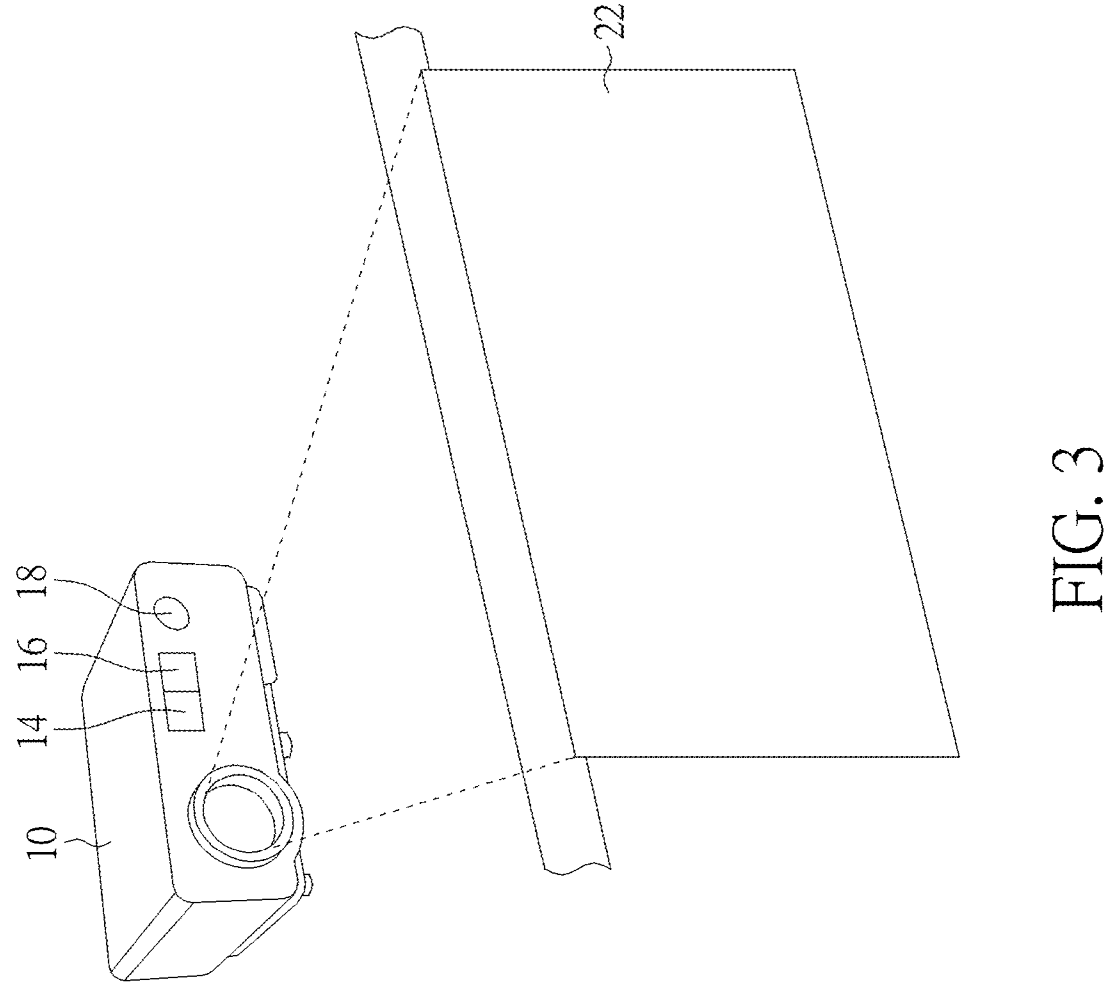
FIG. 3 is an application diagram of the projector device according to the embodiment of the present invention.

Please refer to FIG. 1 to FIG. 3. FIG. 1 is a functional block diagram of a projector device 10 according to an embodiment of the present invention. FIG. 2 is a flow chart of a projector control method according to the embodiment of the present invention. FIG. 3 is an application diagram of the projector device 10 according to the embodiment of the present invention. The projector device 10 of the present invention can have an environment adaptive function, and can automatically adjust an intensity, color temperature or color of a projection image according to an environmental condition of the device location where the projector device 10 is located, so as to conform to the users' viewing scenario and provide the preferred energy economy performance. The projector control method illustrated in FIG. 2 can be suitable for the projector device 10 shown in FIG. 1. The projector device 10 can at least include a projection lens 12, an image detector 14, a size detector 16, an ambient light sensor 18, a storage unit 20 and an operation processor 22; other elements are not essential technical features of the present invention, and omitted herein for simplicity.

The projection lens 12 can project the projection image onto a projection curtain 22. The image detector 14 can face the projection curtain and capture a detection image relevant to the projection image. The size detector 16 can be a ToF (Time of flight) sensor used to compute a size of the detection image on the projection curtain 22; a type of the size detector 16 is not limited to the foresaid embodiment, which depends on a design demand. The ambient light sensor 18 can detect and provide an ambient light intensity of the location where the projector device 10 is located. The storage unit 20 can pre-store an ambient intensity lookup table (which corresponds to Table 1), an image intensity lookup table (which corresponds to Table 2) and a parameter setting table (which corresponds to Table 3). The operation processor 22 can be electrically connected with the projection lens 12, the image detector 14, the size detector 16, the ambient light sensor 18 and the storage unit 20, and used to execute the projector control method illustrated in FIG. 2.

Values of an upper limit and a lower limit of the image intensity shown in Table 1, and values of the upper limit and the lower limit of the ambient light intensity in a forward projection mode and an inverted projection mode shown in Table 2 are not limited to the following embodiments, and depend on an actual condition and the device location of the projector device 10. Table 3 only uses relevant codes to represent control parameter combinations in the parameter setting table, and actual data of the control parameter combinations can be set based on the adjustment requirement of the intensity, the color temperature and/or the color of the projector device 10, so that there has no reference examples of the control parameter combinations are written herein for simplicity.

TABLE 1

| Image Intensity Code (ScreenNits_ID) | Image Intensity (Screen_Nits) Lower Limit | Image Intensity (Screen_Nits) Upper Limit |
|---|---|---|
| 0 | 0 | 90 |
| 1 | 80 | 140 |
| 2 | 135 | 165 |
| 3 | 160 | 200 |
| 4 | 195 | 1000 |

TABLE 2

| Ambient Light Intensity (AmbientLight_Lux) | | | | |
|---|---|---|---|---|
| Ambient Intensity Code | Forward Projection Mode | | Inverted Projection Mode | |
| (AmbientLight_ID) | Lower Limit | Upper Limit | Lower Limit | Upper Limit |
| 0 | 0 | 25 | 0 | 25 |
| 1 | 20 | 40 | 20 | 40 |
| 2 | 30 | 10000 | 35 | 10000 |

TABLE 3

| | 0 | 1 | 2 |
|---|---|---|---|
| 0 | AmbientLight_ID = 0 ScreenNits_ID = 0 | AmbientLight_ID = 1 ScreenNits_ID = 0 | AmbientLight_ID = 2 ScreenNits_ID = 0 |
| 1 | AmbientLight_ID = 0 ScreenNits_ID = 1 | AmbientLight_ID = 1 ScreenNits_ID = 1 | AmbientLight_ID = 2 ScreenNits_ID = 1 |
| 2 | AmbientLight_ID = 0 ScreenNits_ID = 2 | AmbientLight_ID = 1 ScreenNits_ID = 2 | AmbientLight_ID = 2 ScreenNits_ID = 2 |
| 3 | AmbientLight_ID = 0 ScreenNits_ID = 3 | AmbientLight_ID = 1 ScreenNits_ID = 3 | AmbientLight_ID = 2 ScreenNits_ID = 3 |
| 4 | AmbientLight_ID = 0 ScreenNits_ID = 4 | AmbientLight ID = 1 ScreenNits_ID = 4 | AmbientLight_ID = 2 ScreenNits_ID = 4 |

In the projector control method, step S100 and step S102 can be executed to drive the projection lens 12 to project the dark-colored projection image onto the projection curtain 22, and drive the ambient light sensor 18 to detect and acquire an ambient light datum (Ambient_Nits); step S100 can further apply image calibration procedures, such as keystone correction, for the projection image. Then, step S104, step S106 and step S108 can be executed to utilize the image detector 14 to capture the detection image relevant to the projection image, acquire an auto exposure datum of the image detector 14 when capturing the detection image, and drive the size detector 16 to acquire a size of the detection image on the projection curtain 22; step S104 and step S106 can optionally execute calibration procedures, such as ambient light correction and/or curtain light correction, and step S108 can compute a distance and an angle of the projector device 10 relative to the projection curtain 22 and then accordingly compute the size of the detection image. The order of step S100 and step S102 may be interchanged, and the order of step S104, step S106 and step S108 may be adjusted accordingly.

Then, step S110 can be executed to analyze the auto exposure datum and the ambient light datum to generate an ambient light intensity (such as AmbientLight_Lux shown in Table 2, but to limited to this) of the device location where the projector device 10 is located; in the related steps, the projection image can be set as the dark-colored image (e.g., the black projection image) for measuring the correct ambient light intensity. The values of the upper limit and the lower limit shown in Table 1 and Table 2 are not limited to the foresaid embodiments, and depend on the actual condition and the device location of the projector device 10, and actual data of the upper limit and the lower limit may be adjusted based on the auto exposure datum and the ambient light datum of the projection image. Then, step S112 and step S114 can be executed to drive the projection lens 12 to project the bright-colored projection image onto the projection curtain 22, and compute a difference between the ambient light intensity and a projection intensity of the bright-colored projection image for computing the image intensity (such as Screen_Nits shown in Table 1) of the detection image; in the related steps, the projection image can be set as the bright-colored image (e.g., the white projection image) for measuring the correct image intensity. Besides, the projection intensity in step S114 may be an original intensity provided by the projection lens 12 when projecting the projection image, or a receiving intensity of the detection image relevant to the projection image and captured by the image detector 14.

Then, step S116, step S118 and step S120 can be executed to acquire an ambient intensity code (such as Ambient-Light_ID shown in Table 2) from the ambient intensity lookup table stored in the storage unit 20 according to the ambient light intensity, acquire an image intensity code (such as ScreenNits_ID shown in Table 1) from the image intensity lookup table stored in the storage unit 20 according to the image intensity, and acquire the corresponding control parameter combination from the parameter setting table stored in the storage unit 20 according to the ambient intensity code and the image intensity code, and therefore the intensity, the color temperature or the color of the projection image can be adjusted accordingly. It should be mentioned that during execution of all steps in the projector control method, execution of step S108 and step S102 can be re-triggered when the projector device 10 is moved and/or the environmental condition of the device location where the projector device 10 is located is changed, so as to update variable parameters of the projector device 10 at any time and immediately compute and adaptively adjust the optimal intensity, the optimal color temperature and/or the optimal color of the projection image.

In conclusion, the projector device of the present invention can utilize a built-in function to determine that the projector device is in the forward projection mode (e.g., the projector device is put on the table) or in the inverted projection mode (e.g., the projector device is installed on the ceiling) before execution of the projector control method, and then correctly execute the image calibration procedure to acquire the size of the detection image on the projection curtain. Further, the projector control method of the present invention can preferably utilize the black projection image and the white projection image to respectively decide the ambient light intensity and the projection intensity of the projection image, so as to acquire the corresponding control parameter combination for adjusting the intensity, the color temperature and/or the color of the projection image. The projector device and the projector control method of the present invention can effectively mitigate or eliminate interactive influence of reflected brightness gain change and the ambient light intensity resulted by different gains or different sizes of the projection curtain, and therefore can further adjust the projection image in accordance with the usage scenario to improve the viewing effect of the detection image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A projector control method with an environment adaptive function and applied to a projector device, the projector control method comprising:

an operation processor of the projector device driving a projection lens to project a dark-colored projection image onto a projection curtain;

the operation processor utilizing an image detector to acquire a detection image relevant to the dark-colored projection image;

the operation processor acquiring an ambient light intensity based on the image detector configured to capture the dark-colored projection image and an ambient light sensor;

the operation processor driving the projection lens to project a bright-colored projection image onto the projection curtain;

the operation processor utilizing the image detector to acquire the detection image relevant to the bright-colored projection image;

the operation processor acquiring an image intensity of the detection image relevant to the bright-colored projection image based on the bright-colored projection image and the ambient light intensity;

the operation processor driving a size detector to acquire a size of the detection image on the projection curtain; and the operation processor acquiring a control parameter combination in accordance with the size of the detection image, the ambient light intensity and the image intensity to adjust an intensity, color temperature or color of the projection image.

2. The projector control method of claim 1, further comprising:

the operation processor acquiring and analyzing an auto exposure datum of the image detector configured to capture the dark-colored projection image and an ambient light datum detected by the ambient light sensor to generate the ambient light intensity.

3. The projector control method of claim 1, wherein the projector device further comprises a storage unit electrically connected with the operation processor, the projector control method further comprises:

the operation processor acquiring an ambient intensity code from an ambient intensity lookup table in the storage unit in accordance with the ambient light intensity.

4. The projector control method of claim 1, further comprising:

the operation processor computing a difference between the ambient light intensity and a projection intensity of the bright-colored projection image to acquire the image intensity of the detection image relevant to the bright-colored projection image.

5. The projector control method of claim 4, wherein the projection intensity is an original intensity provided by the projection lens when projecting the projection image, or a receiving intensity of the detection image relevant to the projection image and captured by the image detector.

6. The projector control method of claim 1, wherein the projector device further comprises a storage unit electrically connected with the operation processor, the projector control method further comprises:

the operation processor acquiring an image intensity code from an image intensity lookup table in the storage unit in accordance with the image intensity.

7. The projector control method of claim 1, wherein the projector device further comprises a storage unit electrically connected with the operation processor and adapted to store a parameter setting table, the projector control method further comprises:

the operation processor utilizing an ambient intensity code acquired by the ambient light intensity and an image intensity code acquired by the image intensity to acquire the corresponding control parameter combination in the parameter setting table.

8. A projector device with an environment adaptive function, the projector device comprising:

a projection lens adapted to alternately project a dark-colored projection image and a bright-colored projection image onto a projection curtain;

an image detector adapted to alternately acquire detection images relevant to the dark-colored projection image and the bright-colored projection image;

a size detector adapted to acquire a size of the detection image on the projection curtain;

an ambient light sensor; and an operation processor electrically connected with the projection lens, the image detector, the size detector and the ambient light sensor, the operation processor being adapted to acquire an ambient light intensity based on the image detector configured to capture the dark-colored projection image and the ambient light sensor, acquire an image intensity of the detection image relevant to the bright-colored projection image based on the bright-colored projection image and the ambient light intensity, and acquire a control parameter combination in accordance with the size of the detection image, the ambient light intensity and the image intensity for adjusting an intensity, color temperature or color of the projection image.

9. The projector device of claim 8, wherein the operation processor is adapted to further acquire and analyze an auto exposure datum of the image detector configured to capture the dark-colored projection image and an ambient light datum detected by the ambient light sensor to generate the ambient light intensity.

10. The projector device of claim 8, wherein the projector device further comprises a storage unit electrically connected with the operation processor, the operation processor is adapted to further acquire an ambient intensity code from an ambient intensity lookup table in the storage unit in accordance with the ambient light intensity.

11. The projector device of claim 8, wherein the operation processor is adapted to further compute a difference between the ambient light intensity and a projection intensity of the bright-colored projection image to acquire the image intensity of the detection image relevant to the bright-colored projection image.

12. The projector device of claim 11, wherein the projection intensity is an original intensity provided by the projection lens when projecting the projection image, or a receiving intensity of the detection image relevant to the projection image and captured by the image detector.

13. The projector device of claim 8, wherein the projector device further comprises a storage unit electrically connected with the operation processor, the operation processor is adapted to further acquire an image intensity code from an image intensity lookup table in the storage unit in accordance with the image intensity.

14. The projector device of claim 8, wherein the projector device further comprises a storage unit electrically connected with the operation processor and adapted to store a parameter setting table, the operation processor is adapted to further utilize an ambient intensity code acquired by the ambient light intensity and an image intensity code acquired by the image intensity to acquire the corresponding control parameter combination in the parameter setting table.

* * * * *